United States Patent
Bookbinder et al.

(10) Patent No.: US 7,921,675 B2
(45) Date of Patent: Apr. 12, 2011

(54) METHODS FOR MAKING OPTICAL FIBER PREFORMS AND MICROSTRUCTURED OPTICAL FIBERS

(75) Inventors: Dana Craig Bookbinder, Corning, NY (US); Robert Brett Desorcie, Painted Post, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 706 days.

(21) Appl. No.: 11/985,666

(22) Filed: Nov. 16, 2007

(65) Prior Publication Data

US 2009/0126408 A1 May 21, 2009

(51) Int. Cl.
*C03B 37/018* (2006.01)
(52) U.S. Cl. ............................ 65/416; 65/413; 65/417
(58) Field of Classification Search ............. 65/413, 65/417, 416, 427
See application file for complete search history.

(56) References Cited

U.S. PATENT DOCUMENTS

| | | | | |
|---|---|---|---|---|
| 4,188,089 A | * | 2/1980 | Gliemeroth et al. | 385/124 |
| 4,217,027 A | | 8/1980 | MacChesney et al. | 350/96.3 |
| 6,122,935 A | * | 9/2000 | Glodis et al. | 65/384 |
| 7,526,166 B2 | * | 4/2009 | Bookbinder et al. | 385/125 |
| 2005/0094954 A1 | | 5/2005 | Pickrell et al. | 385/123 |
| 2005/0180710 A1 | | 8/2005 | Oh et al. | 385/125 |
| 2006/0120678 A1 | | 6/2006 | Manyam et al. | 385/125 |
| 2007/0104437 A1 | | 5/2007 | Bookbinder et al. | 385/125 |
| 2008/0013905 A1 | * | 1/2008 | Bookbinder et al. | 385/124 |
| 2008/0131066 A1 | * | 6/2008 | Bickham et al. | 385/125 |

FOREIGN PATENT DOCUMENTS

WO WO2008/137153 11/2008

OTHER PUBLICATIONS

Nagel et al., "*Modified Chemical Vapor Deposition*", Optical Fiber Communications, vol. 1, 1985, pp. 1-64.
Monro, Tanya M. et al, "Holey fibers with random cladding distributions", Optics Letters, vol. 25, No. 4, Feb. 15, 2000, pp. 206-208.
Guan, N. et al, "Holey Fibers for Low Bending Loss", IEICE Transactions on Electronics, Electronics Society, Tokyo, JP, vol. E89C, No. 2, Feb. 1, 2006, pp. 191-196.

* cited by examiner

*Primary Examiner* — Queenie Dehghan
(74) *Attorney, Agent, or Firm* — Robert L. Carlson

(57) ABSTRACT

A method of making an optical fiber preform includes depositing silica glass soot on the inside of a substrate tube via a chemical vapor deposition operation. The silica glass soot is consolidated into silica glass under controlled conditions such that the consolidated silica glass on the interior of the substrate tube contains a non-periodic array of gaseous voids in a cladding region of the optical fiber preform. The optical fiber preform may be used to produce an optical fiber having a core and a cladding containing voids formed from the gaseous voids of the cladding region of the optical fiber preform. The core of the optical fiber has a first index of refraction and the cladding has a second index of refraction less than that of the core.

20 Claims, 5 Drawing Sheets

METHODS FOR MAKING OPTICAL FIBER PREFORMS AND MICROSTRUCTURED OPTICAL FIBERS

BACKGROUND OF THE INVENTION

1. Field of the Invention

The present invention relates generally to methods for making optical fiber preforms and optical fibers and, more specifically, to methods of making optical fiber preforms containing gaseous voids and microstructured optical fibers.

2. Technical Background

Optical fibers formed of glass materials have been in commercial use for more than two decades. Although such optical fibers have represented a quantum leap forward in the field of telecommunications, work on alternative optical fiber designs continues. One promising type of alternative optical fiber is the microstructured optical fiber, which includes holes, also commonly referred to as voids, running longitudinally along the fiber axis. The holes generally contain air or an inert gas, but may also contain other materials. The majority of microstructured fibers have a plurality of holes located around the core, wherein the holes extend along the entire length of the optical fiber. These cladding holes are also most typically arranged in a regular, periodic formation around the core of the optical fiber. In other words, if cross sections of the optical fiber are taken along the length of the optical fiber, the same individual holes can be found in essentially the same periodic hole structure relative to one another.

Microstructured optical fibers have previously been manufactured by the so-called "stack-and-draw" method, wherein an array of silica rods and/or tubes are stacked in a close-packed arrangement to form a preform, that can be drawn into fiber using a conventional tower setup. There are several disadvantages to the stack and draw method. The awkwardness of assembling hundreds of very thin canes (defined by rods or tubes), as well as the possible presence of interstitial cavities when stacking and drawing cylindrical canes, may affect dramatically the fiber attenuation by introducing soluble and particulate impurities, undesired interfaces and inducing a reshaping or deformation of the starting holes. Moreover, the relatively low productivity and high cost make this method not much suitable for industrial production.

SUMMARY OF THE INVENTION

One aspect of the present invention relates to a method of making an optical fiber preform comprising gaseous voids. The optical fiber preform may be used to manufacture microstructured optical fibers. The method may comprise depositing layers of porous silica glass based soot inside a substrate tube by a modified chemical vapor deposition process. The silica glass based soot may then be consolidated in the substrate tube under a gaseous atmosphere. The soot may be consolidated under conditions that are effective for trapping a portion of the gaseous atmosphere inside the layers of soot thereby forming at least one layer of silica glass comprising non-periodically distributed gaseous voids. The layer of silica glass comprising gaseous voids may form at least a portion of the cladding region of the optical fiber preform.

Another aspect of the present invention relates to a method of making an optical fiber. An optical fiber preform made in accordance with one embodiment of the present invention may be used to produce an optical fiber comprising a core with a first refractive index and a cladding with a second refractive index less than that of the core. At least a portion of the cladding may comprise voids formed from the gaseous voids in the optical fiber preform.

Additional features and advantages of the invention will be set forth in the detailed description which follows, and in part will be readily apparent to those skilled in the art from that description or recognized by practicing the invention as described herein, including the detailed description which follows, the claims, as well as the appended drawings. It is to be understood that both the foregoing general description and the following detailed description present embodiments of the invention, and are intended to provide an overview or framework for understanding the nature and character of the invention as it is claimed.

BRIEF DESCRIPTION OF THE DRAWINGS

The following description of the specific illustrative embodiments of the present invention can best be understood when read in conjunction with the following drawings in which.

DETAILED DESCRIPTION OF THE ILLUSTRATIVE EMBODIMENTS

The methods of the present invention utilize modified chemical vapor deposition (MCVD) techniques to form optical fiber preforms having a non-periodic distribution of gaseous voids. The resultant preform is used to produce a microstructured optical fiber. The microstructured optical fiber has a non-periodic distribution of voids formed from the gaseous voids in the preform.

Figure 1:
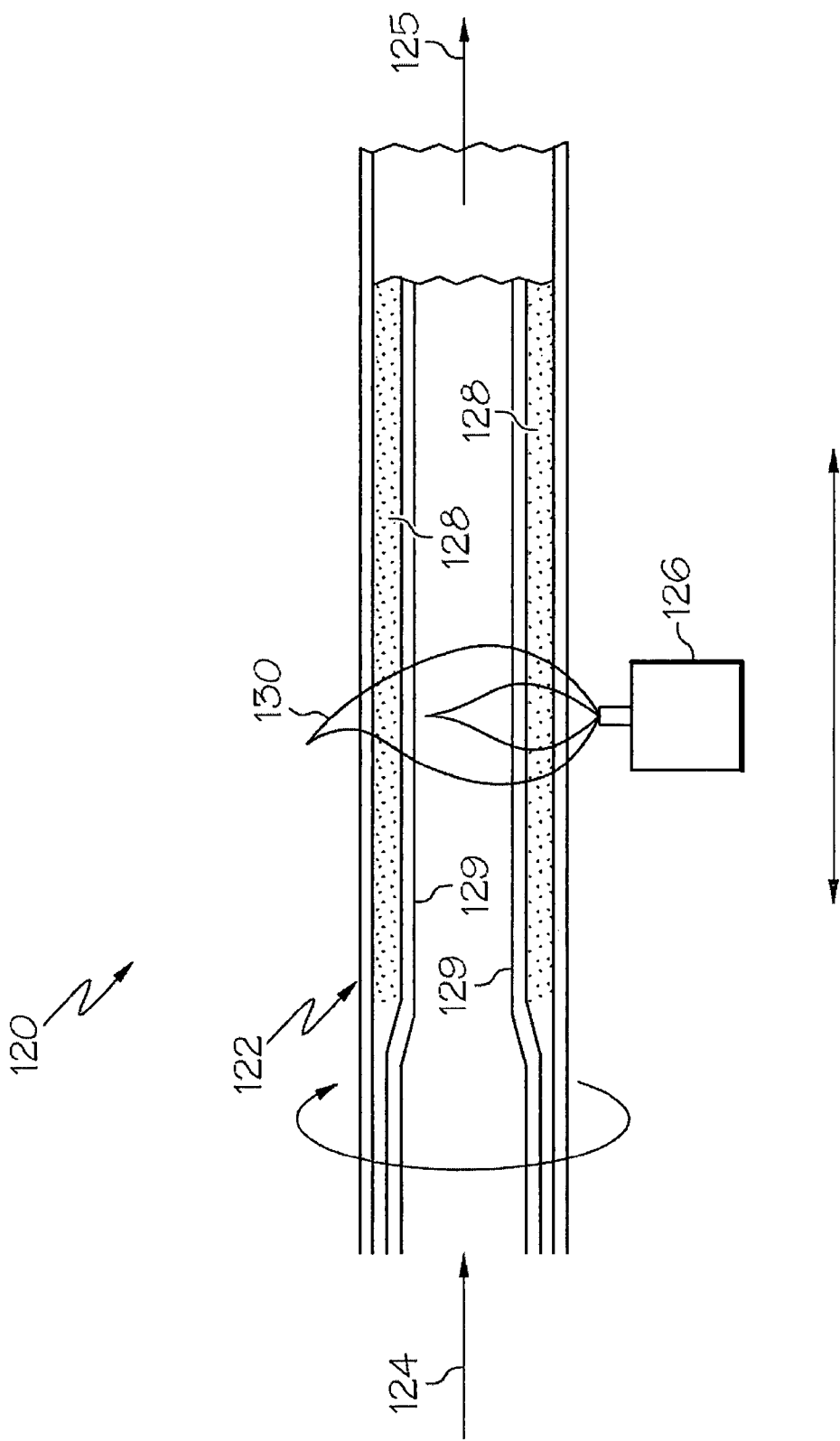
FIG. 1 shows an IVD operation for forming an optical fiber preform in accordance with one embodiment of the present invention.

FIG. 1 is a schematic diagram of a MCVD operation 120 for making an optical fiber preform in accordance with the present invention. As shown in FIG. 1, a substrate tube 122 is positioned relative to a heat source. The heat source may comprise, without limitation, a burner, an electric resistance heater, an inductance heater, or an outside plasma torch. In the embodiment shown in FIG. 2 the heat source is a burner 126. Fuel, such as methane ($CH_4$), and combustion supporting gas, such as oxygen, are supplied to the burner 126 and ignited to form the flame 130. Alternatively, the fuel supplied to the burner 126 may comprise hydrogen. It is to be understood that more than one burner 126 may be used in the MCVD operation. The substrate tube 122 may comprise silica glass or silica glass comprising a dopant for adjusting the index of refraction of the silica glass. The dopant may comprise germania, phosphorous, aluminum, ytterbium, erbium, fluorine, boron, titanium or other conventional dopant materials as are currently known in the art or yet to be developed. The substrate tube 122 may be rotated in the flame 130 as the burner 126 traverses the length of the substrate tube 122.

Referring now to FIG. 1 to illustrate a method of forming an optical fiber preform of the present invention, in a first step a porous layer of silica glass based soot is deposited on the inside of the substrate tube 122 using an MCVD operation. This process is known as an IVD or inside vapor deposition process. Soot is deposited inside the substrate tube 122 by introducing a flow of carrier gas 124 comprising silica glass precursors into the substrate tube 122 while a burner 126 is applied to and traversed along the substrate tube 122. The carrier gas may comprise $O_2$, Ar, $N_2$, Kr, Xe, $CO_2$, $Cl_2$ or combinations thereof. The silica glass precursors may comprise $SiCl_4$, $SiF_4$, $SiHCl_3$, $SiH_2Cl_2$, octamethylcyclotetrasiloxane (OMCTS), hexamethyldisiloxane (HMDZ) or combinations thereof, preferably in gaseous form. It should be understood that the silica glass precursors utilized in the present invention are not limited to those silica glass precursors listed herein and may include any silica glass precursors as may be known in the art or subsequently developed. When the flame 130 of the burner 126 is applied to and traversed along the substrate tube 122, the silica glass precursors in the carrier gas 124 oxidize and silica ($SiO_2$) glass based soot is deposited inside the substrate tube 122 forming a porous layer of soot. Gaseous bi-products 125 of the MCVD operation are expelled from the substrate tube 122 on the opposite end of the tube. The pores in the deposited soot may be formed into gaseous voids or eliminated in a subsequent consolidation step.

In some illustrative embodiments, the soot deposition process may be different depending on whether the soot being deposited is intended to form a void-free layer of silica glass 129 in the optical fiber preform or a void containing layer of silica glass 128 in the optical fiber preform. Pores in the deposited soot tend to form at the interface between layers of soot. As such, the size and spacing of the gaseous voids in the resultant optical fiber preform can be reduced if the thickness of each deposited layer of soot is reduced. Accordingly, to form a void containing layer of silica glass 128 in the optical fiber preform, the soot layer thickness is preferably from about 1 μm to about 200 μm and more preferably from about 5 μm to about 100 μm. The thickness of the layer of deposited soot may be controlled by controlling the parameters under which the soot is deposited. The soot deposition parameters may include the rate at which the substrate tube is heated during the soot deposition process. Where soot is being deposited to form an optical fiber preform comprising both void containing layers and void-free layers of silica glass 128, 129, a portion of the preform is made using soot which is deposited using a first set of soot deposition parameters, and another portion of the preform is made using soot deposited using a second set of soot deposition parameters, wherein the first set of soot deposition parameters are different than the second set of soot deposition parameters. In some embodiments, to facilitate deposition of a thinner layer of deposited soot, it is preferable to employ no more than 4, more preferably no more than 3, and most preferably no more than 2 burners 126 adjacent to one another while the burners 126 are traversing back and forth along the substrate tube 122.

It should be understood that, when depositing silica glass based soot on the inside of the substrate tube 122, a dopant compound may be included in the carrier gas and deposited along with the silica glass based soot. For example, germanium, aluminum, or phosphorous compounds (e.g., $GeCl_4$, $AlCl_3$, $PCl_3$, respectively) may be included as an index of refraction increasing dopant (e.g. in the core region of the optical fiber preform), or a fluorine containing compound (e.g. $SiF_4$ or $CF_4$) may be included to lower the index of refraction (e.g. in the cladding and/or void containing region of the optical fiber preform).

Soot consolidation parameters may then be selected for consolidating the deposited layer of silica glass based soot into silica glass. Consolidation, also commonly referred to as sintering, is a process in which the deposited soot is heated to reduce open porosity (i.e. pores in the soot which are not surrounded by densified glass) and form fully densified silica glass (although in the present invention some closed pores (i.e. pores surrounded by fully densified glass) are intentionally produced in the glass). Depending on the consolidation parameters selected, consolidation may result in the formation of a fully dense, substantially void-free layer of silica glass 129 from the deposited soot or a layer of silica glass having a non-periodic distribution of gaseous voids 128. Substantially void free, as used herein, means that the glass contains an insignificant or incidental amount of gaseous voids such that the index of refraction of the deposited glass is not altered by the presence of the incidental gaseous voids. However, when the gaseous voids are present in a significant amount, the index of refraction of the consolidated silica glass is altered. Increasing the amount of gaseous voids in the silica glass decreases the index of refraction of the silica glass. Moreover, introducing gaseous voids in layers of silica glass that make up an optical fiber preform effects the optical properties of fibers drawn from the optical fiber preform as the gaseous voids contained in the optical fiber preform are drawn into voids when the optical fiber preform is drawn into a fiber. Accordingly, the properties of an optical fiber can be controlled by controlling the formation of gaseous voids in the optical fiber preform.

During consolidation, a gaseous atmosphere is introduced into the substrate tube 122 and a burner 126 is applied to the substrate tube 122 to heat the soot to a temperature sufficient to turn the soot to silica glass and initiate surface energy driven viscous flow sintering. This temperature may be from about 1200° C. to about 2200° C. Once viscous flow sintering has been initiated, densification of the silica glass begins to occur as the plastic flow of silica glass closes the pores of the soot. By controlling consolidation parameters such as the gaseous atmosphere under which the soot is heated, the rate at which the soot is heated, and the rate at which the burner 126 traverses the substrate tube 122, the formation of gaseous voids in the consolidated layer of silica glass can be controlled.

In one embodiment, where gaseous voids are desired in the consolidated layer of silica glass 128, the gaseous atmosphere is selected such that the gaseous atmosphere has a relatively low permeability in silica glass at or below the consolidation temperature. The use of a low permeability gas or gases reduces the possibility that the gas will permeate the silica glass and migrate out of the optical fiber preform thereby reducing the number of gaseous voids formed in the optical fiber preform. Consolidation gases for forming gaseous voids may include nitrogen, argon, $CO_2$, oxygen, chlorine, $CF_4$, CO, $C_2F_6$, $SO_2$, krypton, xenon, neon and mixtures thereof. Preferably, to produce gaseous voids, the consolidation gases are employed either alone or in combination in an amount from about 5 to about 100 percent by volume, more preferably between about 20 to about 100 percent by volume and most preferably between about 40 to about 100 percent by volume. The remainder of the gaseous atmosphere is made up of a suitable diluent or carrier gas such as, for example, helium, hydrogen, deuterium, or mixtures thereof. In some of the embodiments described herein, e.g. when additional soot is planned to be deposited inside the substrate tube 122 by IVD, it is preferable to utilize a gaseous atmosphere during consolidation that employs less than 10 percent oxygen, more preferably less than 5 percent oxygen, and most preferably essentially no oxygen to improve the formation of gaseous voids during subsequent consolidation steps. Generally speaking, the greater the percentage by volume of gaseous void producing gases (nitrogen, argon, $CO_2$, oxygen, chlorine, $CF_4$, CO, $C_2F_6$, $SO_2$, krypton, xenon, neon, and mixtures thereof) that are employed during consolidation, the larger and more abundant the gaseous voids will be in the resultant consolidated silica glass. More preferably, the gaseous atmosphere for use in forming gaseous voids during the consolidation step is selected to comprise at least one gas selected from the group consisting of nitrogen, argon, $CO_2$, oxygen, and krypton. These gases can be utilized entirely alone or in mixtures of such gases along with a carrier gas such as helium. Gaseous voids may also be created by consolidating the soot in a low permeability gas (e.g. nitrogen, argon, $CO_2$, oxygen, chlorine, $CF_4$, $C_2F_6$, CO, $SO_2$ and mixtures thereof) under a partial vacuum (e.g., wherein the substrate tube and deposited soot are immersed in a consolidation atmosphere at a pressure from about 40 to about 750 Torr).

Further, to produce a consolidated layer of silica glass containing gaseous voids 128 in the optical fiber preform, a heating rate to consolidate the soot is selected to be sufficiently high so as to close open pores in the soot before gas contained in the soot can escape. This causes the gas to become trapped in the silica glass thereby forming a gaseous void. The heating rate required to form gaseous voids is dependent upon the gaseous atmosphere in which the consolidation is performed. Generally, to form gaseous voids, the selected heating rate used to consolidate the layer of deposited soot is sufficient to result in a heating rate in degrees ° C./sec$\geq 1820$[ soot thickness in microns$^{(-0.9)}$]. In some embodiments, the minimum heating rate is 0.25° C./sec. In some embodiments, the selected heating rate used to consolidate the layer of deposited soot is from about 20° C./sec to about 200° C./sec when the soot temperature at the start of the consolidation process is 1100° C. The heating rate may also be effected by the temperature of the burner 126 and by the rate at which the burner 126 is traversed along the outside of the substrate tube 122. By way of example, to produce gaseous voids during the consolidation step, a gaseous atmosphere of oxygen and argon may be introduced into the substrate tube 122 at a 1:4 ratio of $O_2$:Ar. The layer of soot is then heated at a heating rate of about 20° C./sec.

In another embodiment, to produce a substantially void-free layer of consolidated silica glass 129, the heating rate used to consolidate the soot is selected to be sufficiently low such that the pores in the soot remain open long enough for gas contained in the soot to escape as the layer of soot is heated thereby preventing the gas from become trapped in the soot and producing voids. As the consolidation process reaches maximum temperature, the gas content of the soot is significantly reduced and the viscous flow of silica glass closes the now gas-free pores of the soot thereby forming a consolidated layer of silica glass that is substantially void-free 129. To produce a substantially void-free layer of silica glass 129, the soot is consolidated in the presence of a gaseous atmosphere comprising oxygen, helium, or mixtures thereof. Preferably, to form a substantially void-free layer of silica glass 129, the gaseous atmosphere introduced in the substrate tube during consolidation is generally from about 0 to 8 times in excess of the incoming silica glass precursor used to deposit the silica glass soot. For example, when the silica glass precursor is $SiCl_4$ and the gaseous atmosphere used during the consolidation process is oxygen, the ratio of $SiCl_4$ to oxygen may be from about 1:1 to about 1:9 by mole. The heating rate required to produce a substantially void-free layer of silica glass 129 is dependent upon the gaseous atmosphere selected. Generally, to form a substantially void-free layer of silica glass 129, the heating rate selected to consolidate the layer of deposited soot is from about 2° C./sec to less than about 10° C./sec when the temperature of the soot at the start of the consolidation step is above 1100° C. The heating rate may also be effected by the temperature of the burner 126 and the rate at which the burner 126 is traversed along the outside of the substrate tube 122. Increasing the traverse rate of the burner 126 will increase the heating rate necessary to form a substantially void-free layer of silica glass. By way of example, to produce a substantially void-free layer of silica glass 129 during the consolidation step, a gaseous atmosphere of oxygen may be introduced into the substrate tube 122 and the layer of deposited soot heated at a heating rate of about 2° C./sec.

The deposited soot may then be consolidated using the selected consolidation parameters. The selected gaseous atmosphere is introduced into the substrate tube 122 and the flame 130 of a burner 126 is applied to and traversed across the exterior of the substrate tube 122 according to the selected consolidation parameters to consolidate the deposited layer of soot thereby forming at least a portion of a cladding region of an optical fiber preform. Depending on the consolidation parameters selected, the consolidated silica glass on the inside of the substrate tube 122 may be either substantially void-free silica glass 129 or void containing silica glass 128.

Alternatively, the deposition and consolidation steps may be combined in a single step such that layers of soot are deposited inside the substrate tube 122 and consolidated into a void containing or void-free layer of silica glass 128, 129 in a single step. It should also be understood that one or more burners 126 may be traversed across the substrate tube 122 under different operating conditions to facilitate the deposition of soot and the consolidation of the soot in a single operation. Further, it should be understood that the step of consolidating the soot may be performed after a single layer of soot has been deposited inside the substrate tube or after multiple layers of soot have been deposited in the substrate tube.

If the formation of the cladding region of the optical fiber preform is complete, a core region of the optical fiber preform may then be formed. If the formation of the cladding region of the optical fiber preform is not complete, the above steps may be repeated and an additional layer of soot deposited inside the substrate tube 122 and consolidated under conditions appropriate to achieve a substantially void-free or void containing layer of silica glass to form the cladding region of the optical fiber preform. It should be understood that the term cladding region, as used herein, may include the substrate tube 122 and any void-free and/or void containing layers of silica glass 128, 129 contained therein.

In one embodiment, shown in FIG. 1, when the formation of the cladding region of the optical fiber preform is not complete, a second or subsequent layer of soot is deposited inside the substrate tube 122 after a void containing layer 129 of silica glass has been consolidated inside the substrate tube 122. Consolidation parameters may be selected such that the second or subsequent layer of soot is consolidated to form a substantially void-free layer of silica glass. The second or subsequent porous layer of soot is then consolidated using the selected parameters to form a substantially void-free layer of silica glass 129 inside the substrate tube 122.

Alternatively, in another embodiment, when the formation of the cladding region of the optical fiber preform is not complete, a second or subsequent layer of soot is deposited inside the substrate tube 122 after a substantially void-free layer of silica glass has been formed inside the substrate tube 122. Consolidation parameters may be selected such that the second or subsequent layer of porous soot is consolidated to form a void containing layer of silica glass. The second or subsequent porous layer of soot is then consolidated using the selected parameters to form a void containing layer of silica glass 129 inside the substrate tube 122.

It should be understood that, when the cladding region of the optical fiber preform is not complete, the above deposition steps can be repeated multiple times to form multiple layers of silica glass inside the substrate tube 122 thereby forming the cladding region of the optical fiber preform. It should also be understood that, for each subsequent layer of silica glass based soot deposited inside the substrate tube 122, the consolidation parameters may be selected such that the consolidated layer of silica glass contains voids or is substantially void-free.

By way of example, in one embodiment, the deposition and/or consolidation steps may be repeated multiple times to form consecutive layers of silica glass comprising voids inside the substrate tube 122.

In another embodiment, the deposition and/or consolidation steps may be repeated such that less than 20, more preferably less than 10, and most preferably less than 5 consecutive layers of silica glass comprising voids are formed inside the substrate tube 122.

In another embodiment, after consecutive layers of silica glass comprising voids have been formed inside the substrate tube 122, the deposition and/or consolidation steps may be repeated to form a single layer or multiple consecutive layers of substantially void-free silica glass inside the substrate tube 122 within the consecutive layers of silica glass comprising voids.

It will be understood that, the process of alternating between forming layers of silica glass comprising voids and substantially void free layers of silica glass inside the substrate tube 122 may be repeated until formation of the cladding region of the optical fiber preform is complete.

After the cladding region is formed, a core region of the optical fiber preform may be formed. In one embodiment of the present invention a core region of the optical fiber preform may be formed in the substrate tube 122 by depositing one or more layers of soot inside the substrate tube 122 and, more specifically, inside the void-containing cladding region of the optical fiber preform. To form the core region of the optical fiber preform the porous layers of soot are consolidated under conditions suitable for forming substantially void-free silica glass as described herein. The core region of the optical fiber preform has an index of refraction greater than the index of refraction of the cladding region.

Figure 2:
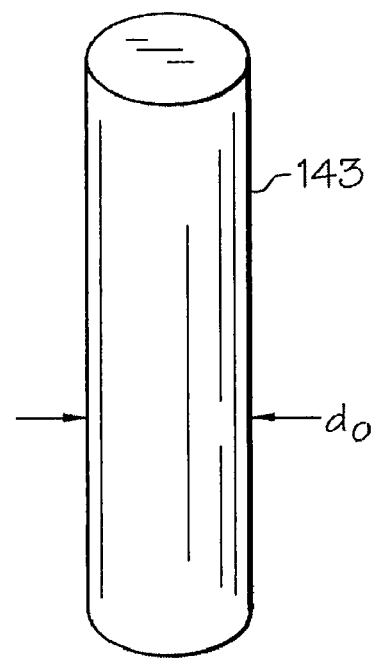
FIG. 2 shows a rod in tube manufacturing process for forming an optical fiber preform which may be employed with various embodiments of the present invention.
Figure 2:
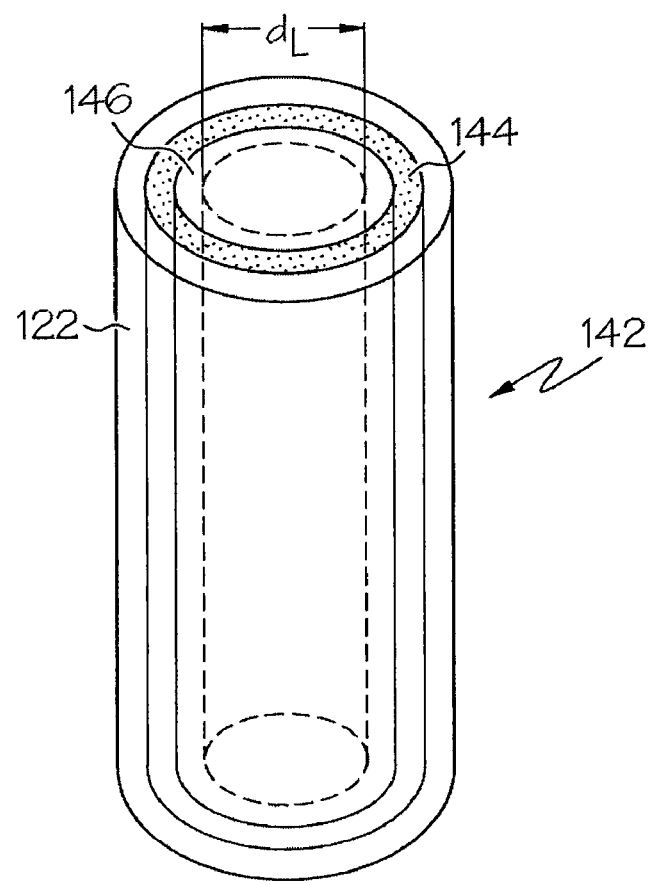
Figure 3:
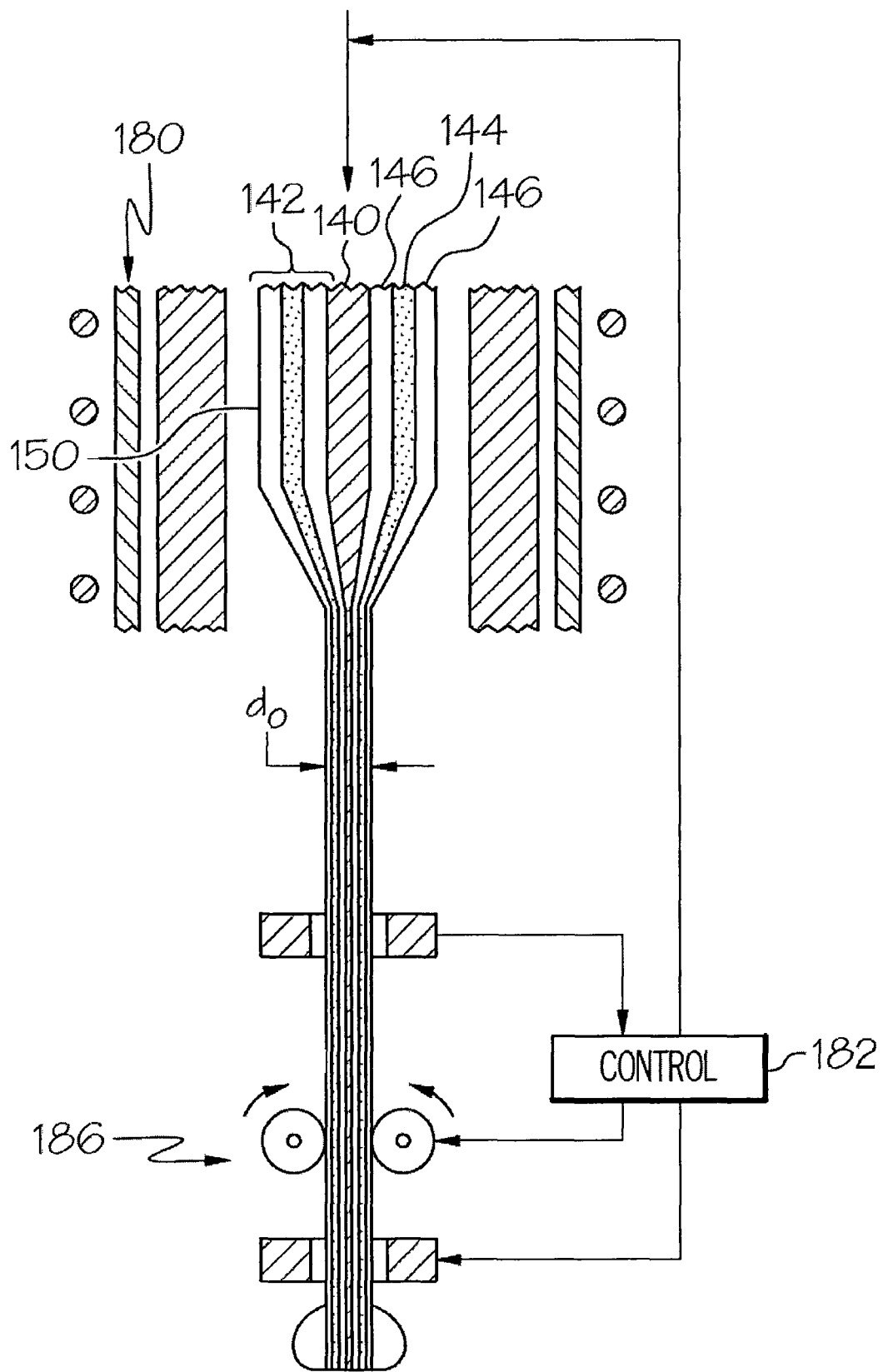
FIG. 3 shows a redraw process that may be employed with various embodiments of the present invention.

In another embodiment, instead of depositing and consolidating soot inside the substrate tube 122 to form a core region, the substrate tube 122 and the deposited layers of silica glass 128, 129 contained therein, together forming the cladding region 142, may be used to sleeve a void-free core cane 143 of silica glass to form a core region of the optical fiber preform. Such sleeving may be accomplished, for example, using conventional rod in tube manufacturing techniques as shown in FIGS. 2 and 3. As illustrated in FIG. 2, the sleeving process may comprise a pure (i.e., substantially free of index of refraction increasing dopants such as germanium) and void free (i.e., substantially free of index of refraction increasing gaseous voids) silica core cane 143 inserted into the cladding region 142 comprising void-free layers of silica glass 146 and gaseous void containing layers of silica glass 144. Preferably, the index of refraction of the core cane 143 is greater than the index of refraction of the cladding region 142. As shown in FIG. 3, to form the optical fiber preform 150, the silica core cane 143 and cladding region 142 are heated to a suitable temperature (e.g. greater than about 1300 to 1500° C.) in a redraw furnace 148 and then redrawn to a smaller diameter using rod in tube manufacturing process steps, thereby forming an optical fiber preform 150 comprising a core region 140 and a cladding region 142 from which an optical fiber can be drawn having a pure silica core surrounded by a void containing cladding in accordance with the present invention.

Figure 4:
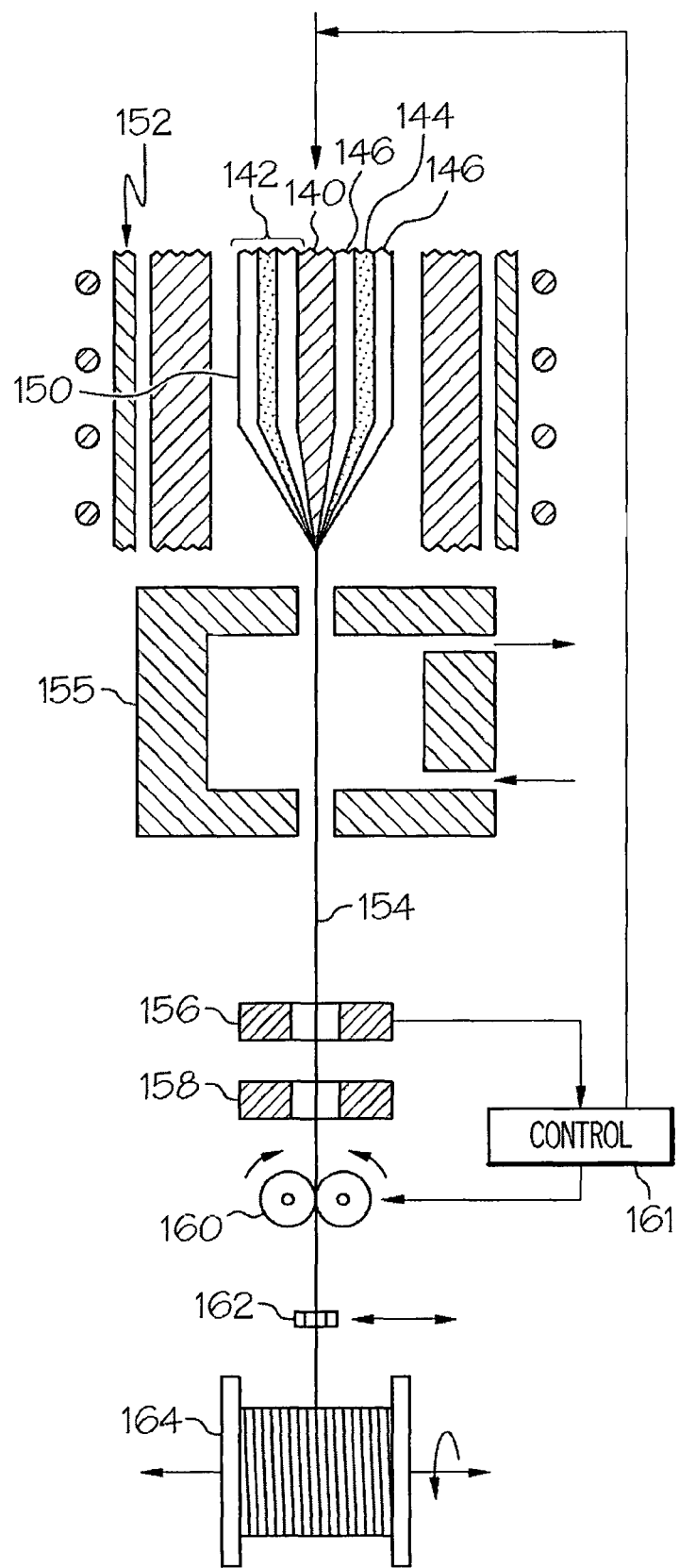
FIG. 4 shows a process and apparatus for drawing an optical fiber from an optical fiber preform that may be employed with various embodiments of the present invention.

As shown in FIG. 4 the optical fiber preform 150 made in accordance with one embodiment of the present invention may comprise a cladding region 142 and a core region 140. The core region 140 may be formed from substantially void-free silica glass. The cladding region 142 may comprise at least one layer of silica glass containing gaseous voids 144 and at least one layer of substantially void-free silica glass 146. Preferably, the layer of silica glass containing gaseous voids 144 may be spaced from the core 140 with a layer of substantially void-free silica glass 146 disposed there between. It should be understood that the structure of the cladding region 142, as described herein, is exemplary in nature and that the layers 144, 146 of the cladding region 142 may be oriented relative to the core region 140 in a variety of configurations depending on the desired optical properties of the fiber drawn from the preform 150.

It should also be understood that the silica glass contained in both the core region 140 and the cladding region 142 may also comprise dopants, such as fluorine or germanium or any other dopant material suitable for adjusting the index of refraction of the core region 140 and/or the cladding region 142. Further, the presence of dopants in the optical fiber preform 150 may be controlled during the formation of the optical fiber preform 150. For example, it may be desirable to form a specific layer of glass in the cladding region 142 such that the layer contains both gaseous voids and a dopant. During the formation of that specific layer of glass, the silica precursors in the carrier gas may be switched to, for example, $SiF_4$ such that the layer of deposited glass contains both gaseous voids and fluorine dopant. In this manner the presence and location of dopants in the optical fiber preform may be controlled.

Figure 5:
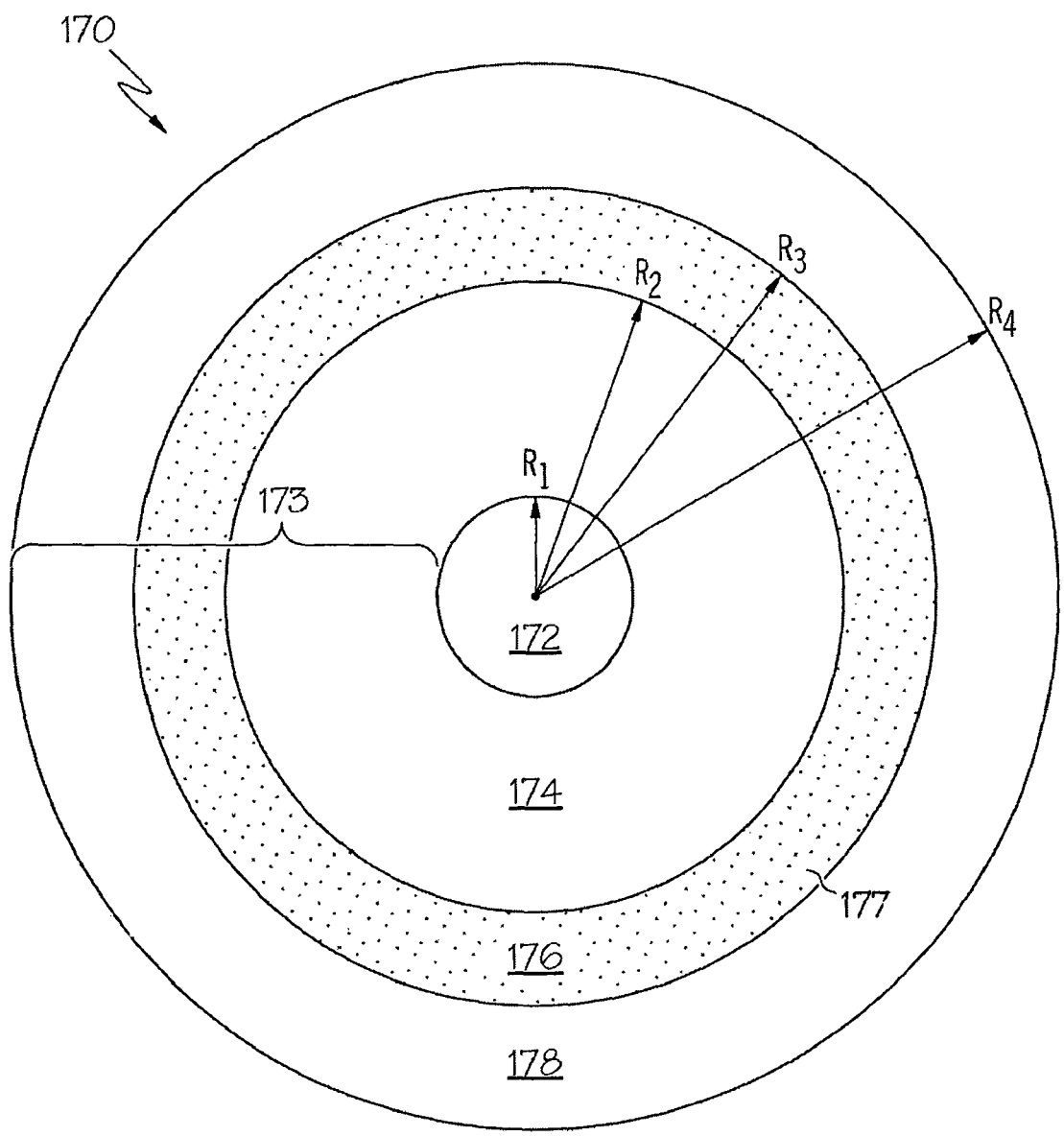
FIG. 5 shows a cross section of an optical fiber made in accordance with one embodiment of the present invention.

FIG. 5 shows a conventional method and apparatus for drawing an optical fiber preform which may be used in conjunction with any one of the embodiments disclosed herein. The optical fiber preform 150 may be drawn into an optical fiber 154 by positioning the preform 150 within a draw furnace 152, as shown in FIG. 5, and then heating and drawing the optical fiber 154. The fiber 154 is then cooled in a cooling chamber 155 and measured for final diameter with a non-contact sensor 156. One or more coatings may be applied and cured by a coating apparatus 158. During the draw, the fiber 154 passes through a tension assembly 160 whereby tension is applied to draw the fiber 154 from the preform 150. The tension is controlled via a control apparatus 161 to maintain the fiber diameter at a predetermined set point. Finally, the coated fiber 154 is wound by a feedhead 162 onto a fiber storage spool 164.

In an alternate embodiment, prior to drawing the fiber 154 from the optical fiber preform 150 as shown in FIG. 5, the optical fiber preform 150 may be redrawn in a redraw process as illustrated in FIG. 3. Such a redraw process can be used to modify the size of the gaseous voids contained in the optical fiber preform 150. For example, the greater the diameter reduction that occurs when the void containing preform 150 is redrawn, the smaller the gaseous void size will be in that preform 150.

A typical redraw process is shown in FIG. 3. In the redraw process the optical fiber preform 150 is placed in a draw furnace 180 and heated to a temperature of, for example, between about 1700° C. and 2000° C. The fiber preform 150 is then drawn to reduce the diameter of the preform 150. The controls 182 control the tension applied to the preform 150 by suitable control signals to a tension apparatus 186 to draw down the preform 150 at the proper speed. In this manner, it is possible to reduce the outer diameter of the optical fiber preform 150 while modifying the size of the gaseous voids contained in the optical fiber preform 150.

Referring now to FIG. 5, a cross section of an optical fiber 170 drawn from an optical fiber preform made in accordance with one embodiment of the present invention is shown. The optical fiber 170 contains a core 176 and a cladding 173. The core 176 is substantially void-free and has a first index of refraction. The cladding 173 has a second index of refraction and at least a portion of the cladding 173 comprises voids 177. The portion of the cladding 173 comprising voids 177 is formed from the region of the optical fiber preform comprising gaseous voids. When the optical fiber 170 is drawn from the optical fiber preform, the gaseous voids of the optical fiber preform are elongated and extend axially along the length of the fiber. Because the voids 177 extend along the length of the fiber 170, the voids 177 depicted in the radial cross section of the optical fiber 170 shown in FIG. 7 are illustrated in cross section and appear as holes. The index of refraction of the cladding 173 is less than the index of refraction of the core 172 due, at least in part, to the presence of the voids 177 in the cladding 173. The difference in the respective indices of refraction is such that light transmitted through the fiber 170 is retained generally within the core 172.

Still referring to FIG. 5, in one embodiment, the portion of the cladding 173 containing voids 177 may be a void containing ring 176 of silica glass spaced from the core 172 of the optical fiber 170 with a substantially void-free ring 174 of silica glass disposed between the core 172 and the void containing ring 176. For example, the void containing ring 176 of silica glass may be a relatively thin ring spaced from the core 172 of the optical fiber 170, but not extending entirely to the outer perimeter of the optical fiber 170. The radial width of the void containing ring 176 may be from about 0.5 μm to about 40 μm, more preferably from about 1 μm to about 20 μm, and most preferably from about 2 μm to about 10 μm. The void containing ring 176 of the optical fiber 170 may be spaced from the core 172 by a radial distance of about 0.5 μm to about 20 μm, more preferably from about 1 μm to about 15 μm, and most preferably from about 2 μm to about 10 μm. Spacing the void containing ring 176 from the core 172 may lower the attenuation of the optical fiber 170 at 1550 nm, a typical wavelength of light transmitted through the optical fiber. A thin void containing ring 176 also facilitates making the optical fiber 170 single moded at 1550 nm. The optical fiber 170 may include dopants, such as germania, fluorine, titanium, boron, phosphorous, aluminum or any other doping material now known or subsequently developed, to adjust the refractive index of the core 172 and/or each region of the cladding 173, but these dopants may also be avoided and, instead, the voids 177 alone may be used to adjust the index of refraction of the cladding 173 with respect to the core 172.

Still referring to FIG. 5, in one embodiment, the radial thickness of the void containing ring 176 (R3–R2) may be described in terms of the radius of the entire fiber (R4). The radial thickness of the void containing ring 176 may be from about 0.016*R4 to about 0.4*R4. For example, for a 125 μm diameter fiber (R4=62.5 μm), the radial thickness of the void containing ring 176 may be from about 1 μm to about 25 μm.

In another embodiment, the position of the void containing ring 176 in the optical fiber 170 may be described by a ratio of the radius of the core (R1) to the radial distance (R2) of the void containing ring 176 of the cladding. The radial position of the void containing ring 176 may be such that ratio of R1/R2 is from about 0.15 to about 0.80 and more preferably from about 0.25 to about 0.50.

Still referring to the cross section of the optical fiber 170 shown in FIG. 5, in one embodiment, the optical fiber 170 may be 125 μm in diameter and the void containing ring 176 may be radially spaced from the core 172 (i.e. R2–R1) by about 0.5 μm to about 40 μm, most preferably from about 2 μm to about 10 μm. The radial thickness of the void containing ring 176 is from about 1 μm to about 25 μm.

The voids 177 contained in the cladding region 173 may be non-periodically distributed through the cross section of the fiber 170. Non-periodic distribution means that, for a given cross section of the optical fiber 170, the voids 177 are randomly or non-periodically distributed across at least a portion of the fiber 170. Cross sections taken at different points along the length of the fiber 170 will exhibit slightly different non-periodic distributions of voids 177, and the cross section of the voids 177 will also differ. Individual voids 177 may stretch along the length of the fiber 170, but may not extend the entire length of the fiber 170. While not wishing to be bound by theory, it is believed that individual voids 177 extend less than a few meters, and in many cases less than 1 meter, along the length of the fiber 170. However, voids 177 are contained along the entire length of the fiber.

Using the IVD techniques disclosed herein to produce an optical fiber preform containing gaseous voids, it is possible to make optical fibers with claddings that exhibit a total fiber-void area percent (i.e., total cross-sectional area of the void holes divided by total cross-sectional area of the optical fiber multiplied by 100) greater than 0.01 percent, more preferably greater than 0.05 percent, most preferably greater than about 0.5 percent. However, it is believed that, depending on fiber design, a total fiber-void area percent of less than 1, more preferably less than 0.7, and most preferably in the range from about 0.01 to about 0.5 percent, may result in a fiber with greatly improved bend performance.

In some illustrative embodiments, the total fiber-void area percent in the fiber is less than 20, more preferably less than 15, even more preferably less than 10, and most preferably less than 5 percent. Such void containing claddings can be used to lower the refractive index of the optical fiber cladding relative to the optical fiber core and thus form a cladding which guides light along the core of the optical fiber. By selecting the appropriate IVD conditions when making the optical fiber preform and thereby controlling the formation of gaseous voids in the preform, as described above, a variety of useful optical fiber designs can be achieved. For example, by selecting the maximum gaseous void size in the optical fiber preform to be less than that of the wavelength of light which is to be transmitted (for example, less than 1550 nm for some telecommunications systems), and preferably less than one half of the wavelength of light which is to be transmitted along the fiber, low attenuation fibers can be achieved without the use of expensive dopants. Consequently, for a variety of applications, it is desirable for the gaseous voids to be formed in the preform such that at least greater than 95% of and preferably all of the gaseous voids, and therefore the voids in the optical fiber, each have a maximum cross section in the cladding of the optical fiber which is greater than about 1 nm and less than about 1550 nm, more preferably greater than about 1 nm and less than about 775 nm, most preferably greater than about 1 nm and less than about 250 nm. Likewise, it is preferable that the mean cross sectional diameter of the voids in the fiber be less than 7000 nm, more preferably less than 2000 nm, and even more preferably less than 1550 nm, and most preferably less than 775 nm, all of which mean diameters may be achievable using the methods disclosed herein. In some embodiments, the fibers disclosed herein may have greater than 10 and less than 5000 voids, in some embodiments greater than 10 and less than 1000 voids, and in some embodiments the total number of voids may be greater than 10 and less than 500 voids in a given optical fiber perpendicular cross-section. Of course, the most desired fibers may exhibit combinations of these characteristics. Thus, for example, in one illustrative embodiment of an optical fiber may exhibit less than approximately 200 voids in the optical fiber, the voids having a maximum diameter of less than 1550 nm and a mean diameter less than 775 µm, although useful and bend resistant optical fibers can be achieved using larger and greater numbers of voids.

It will be apparent to those skilled in the art that various modifications and variations may be made to the present invention without departing from the spirit and scope of the invention. Thus it is intended that the present invention cover the modifications and variations of this invention provided they come within the scope of the appended claims and their equivalents.

What is claimed is:

1. A method of making an optical fiber preform, the method comprising:
   depositing porous layers of silica glass based soot inside a substrate tube via a chemical vapor deposition process; and
   consolidating the porous layers of silica glass based soot in a gaseous atmosphere by traversing a heat source on the outside of the substrate tube under conditions which are effective to trap a portion of the gaseous atmosphere inside the layers to form at least one silica glass layer comprising gaseous voids in at least a portion of a cladding region of the optical fiber perform, wherein, to form at least a portion of the cladding region comprising gaseous voids, the silica glass based soot is consolidated by heating the deposited silica glass based soot such that the heating rate in degrees $°C./sec > 1820[\text{soot thickness in microns}^{(-0.9)}]$.

2. The method of claim 1 wherein the gaseous voids are non-periodically distributed in at least a portion of a cladding region of the optical fiber preform.

3. The method of claim 1 wherein the gaseous atmosphere comprises $Ar$, $N_2$, $CO_2$, $CO$, $Cl_2$, $Kr$, $Xe$, $O_2$, $CF_4$, $C_2F_6$, $SO_2$ or mixtures thereof.

4. The method of claim 1 wherein a deposited layer of silica glass based soot has a thickness from about 1 µm to about 200 µm.

5. The method of claim 1 wherein depositing porous layers of silica glass based soot inside the substrate tube and consolidating the porous layers of silica glass based soot occurs in a single step.

6. The method of claim 1 wherein individual porous layers of deposited silica glass based soot are consolidated before subsequent porous layers of silica glass based soot are deposited or multiple porous layers of deposited silica glass based soot are consolidated together.

7. The method of claim 1 wherein the acts of depositing porous layers of silica glass based soot inside the substrate tube and consolidating the porous layers of silica glass based soot are repeated multiple times such that consecutive layers of silica glass comprising voids are formed inside the substrate tube.

8. The method of claim 1 further comprising:
   depositing porous layers of silica glass based soot inside the substrate tube via a chemical vapor deposition operation;
   consolidating the porous layers of silica glass based soot in a second gaseous atmosphere by traversing a heat source on the outside of the substrate tube under conditions which are effective to form at least one substantially void-free layer of silica glass in at least a portion of the cladding region of the optical fiber preform.

9. The method of claim 8 wherein, to form at least one substantially void-free layer of silica glass in at least a portion of the cladding region of the optical fiber preform, the at least one deposited layer of silica glass based soot is heated at a rate from about 1° C./sec to about less than 10° C./sec.

10. The method of claim 8 wherein, to form at least one substantially void-free layer of silica glass in at least a portion of the cladding region of the optical fiber preform, the second gaseous atmosphere comprises helium, oxygen and/or mixtures thereof in a molar ratio with the silica glass precursor from about 1:1 to about 1:9 silica glass precursor: gaseous atmosphere.

11. The method of claim 8 wherein the acts of depositing porous layers of silica glass based soot inside the substrate tube and consolidating the deposited porous layers of silica glass based soot inside the substrate tube to form at least one substantially void-free layer of silica glass inside the substrate tube are performed after multiple layers of silica glass comprising voids have been formed inside the substrate tube.

12. The method of claim 8 wherein the acts of depositing silica glass based soot inside the substrate tube and consolidating the silica glass based soot to form layers of silica glass comprising voids or substantially void-free layers of silica glass are repeated such that alternating layers of silica glass comprising voids and substantially void-free layers of silica glass are formed inside the substrate tube.

13. The method of claim 8 wherein the acts of depositing silica glass based soot inside the substrate tube and consolidating the silica glass based soot to form layers of silica glass comprising voids or substantially void-free layers of silica glass are repeated such that the cladding region of the optical fiber preform comprises consecutive layers of silica glass comprising voids and consecutive layers of substantially void-free silica glass.

14. The method of claim 1 wherein the optical fiber preform comprises a core region having a first index of refraction and a cladding region with a second index of refraction less than that of the core region, wherein the cladding region comprises one or more layers of silica glass comprising gaseous voids.

15. The method of claim 14 wherein the core region is formed by depositing silica glass based soot in the substrate tube and consolidating the soot such that the core region is substantially void-free.

16. The method of claim 14 wherein the core region is formed by inserting a void-free glass rod into the substrate tube after formation of the cladding region of the optical fiber preform.

17. The method of claim 14 wherein the cladding region comprises at least one substantially void-free layers of silica glass.

18. The method of claim 1 wherein the optical fiber preform is used to produce an optical fiber of radius R comprising a core with a first index of refraction and a cladding with a second index of refraction less than the first index of refraction, wherein at least a portion of the cladding is formed from the portion of the cladding region of the optical fiber preform comprising gaseous voids such that at least a portion of the cladding of the optical fiber comprises voids.

19. The method of claim 18 wherein the portion of the cladding comprising voids is spaced from the core of the optical fiber by a radial distance of from about 1 µm to about 25 µm.

20. The method of claim 18 wherein a cross section of the portion of the cladding comprising voids has a radial thickness from about 0.016*R to about 0.4*R.

* * * * *